June 5, 1928.  
W. CHRISTIANSEN  
SOLAR HEATER  
Filed Sept. 21, 1927   5 Sheets-Sheet 1

1,672,750

Walter Christiansen, INVENTOR

Victor J. Evans
ATTORNEY

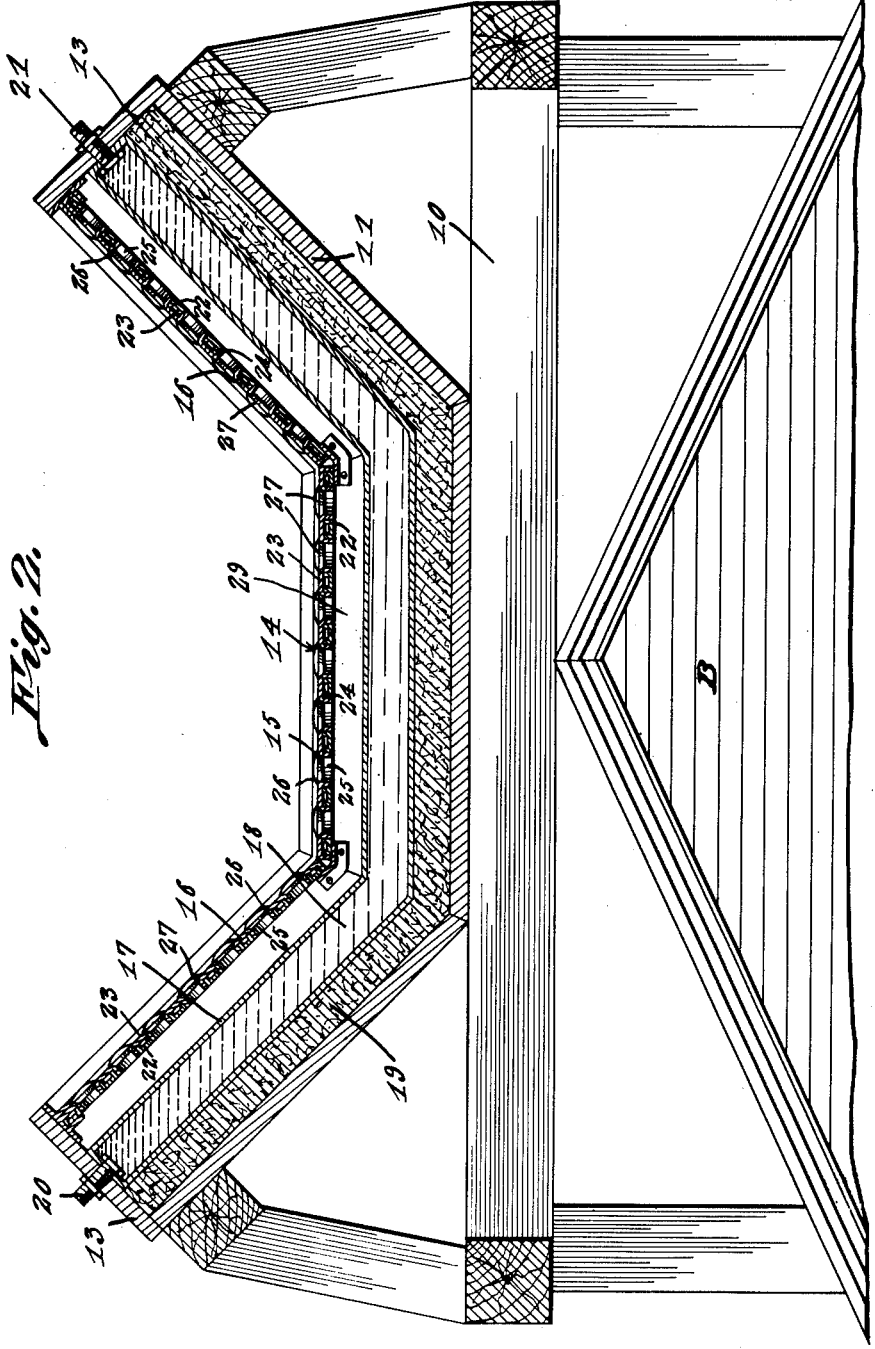

June 5, 1928.
W. CHRISTIANSEN
SOLAR HEATER
Filed Sept. 21, 1927
1,672,750
5 Sheets-Sheet 3
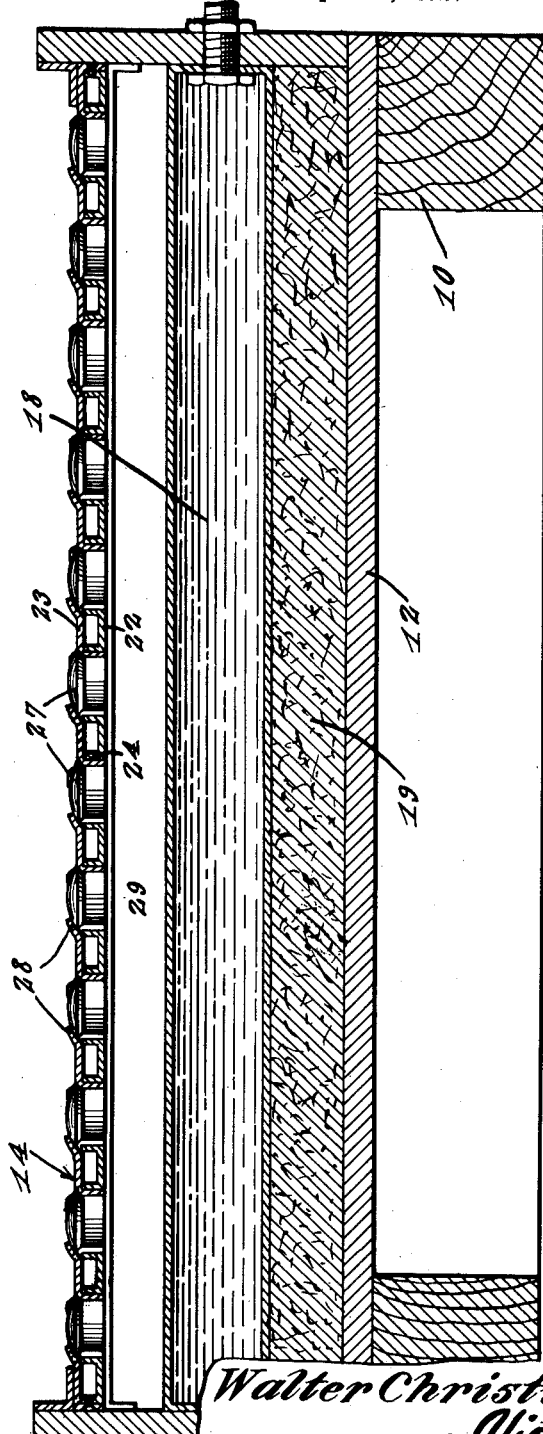
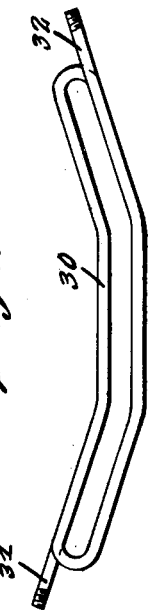
Walter Christiansen, INVENTOR
BY Victor J. Evans
ATTORNEY

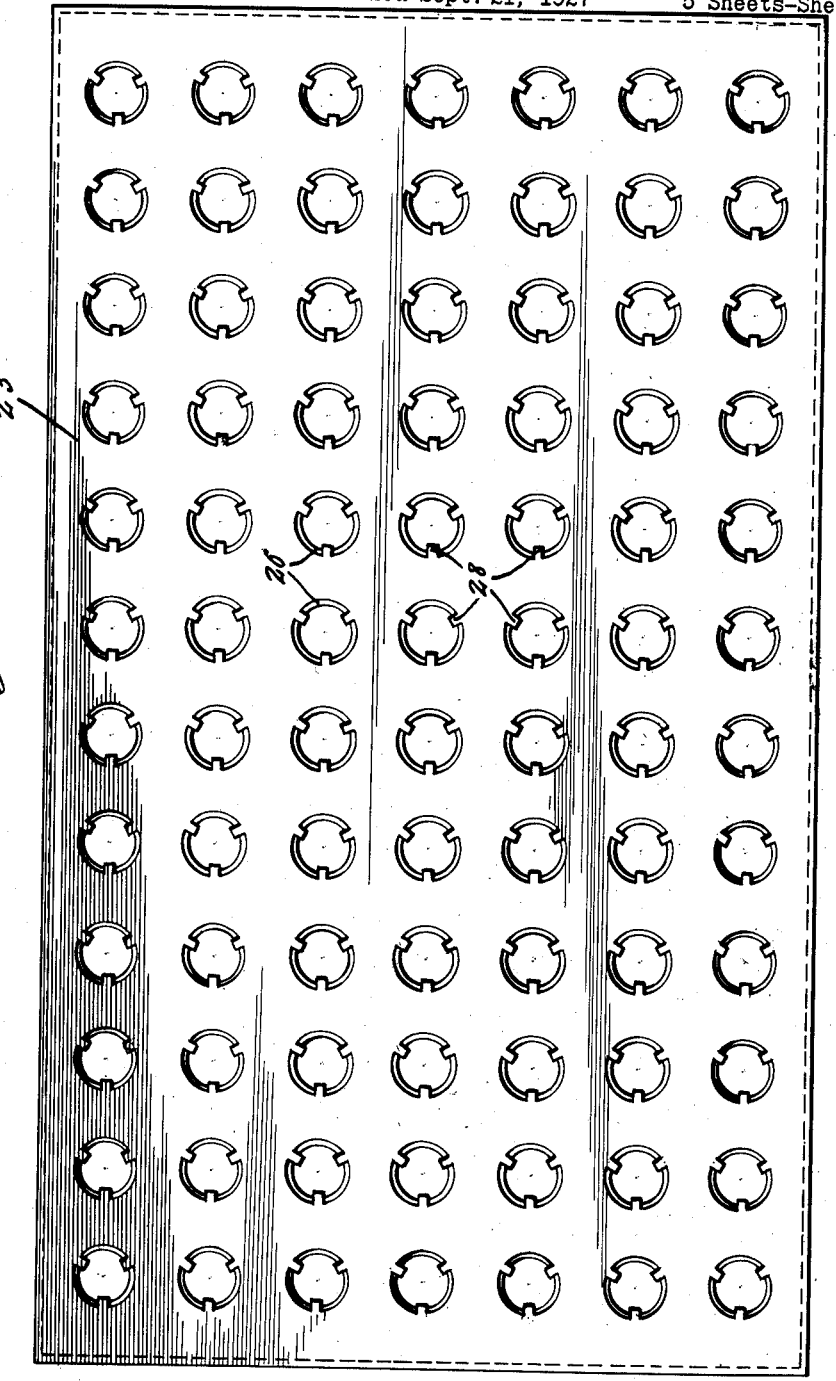

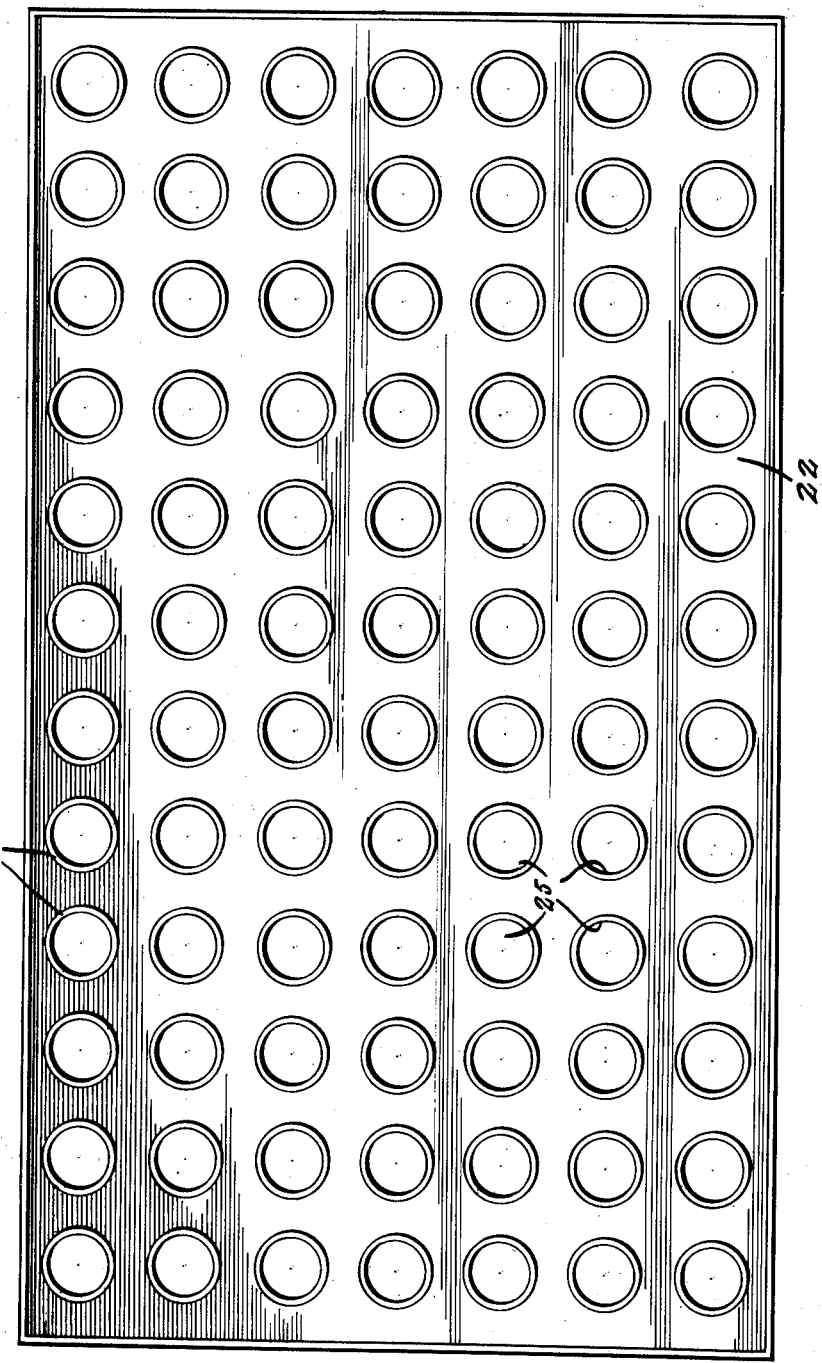

Patented June 5, 1928.

1,672,750

UNITED STATES PATENT OFFICE.

WALTER CHRISTIANSEN, OF MIAMI, FLORIDA.

SOLAR HEATER.

Application filed September 21, 1927. Serial No. 221,032.

This invention relates to heaters, an object being to provide means for utilizing the heat of the sun rays for heating water.

Another object of the invention is the provision of a heater of this character which is constructed of sections arranged so that one or more sections will be positioned transversely of the direct rays of the sun as the latter travels across the horizon, together with means for directing the sun's heat upon a receptacle or container for water or other liquid and to provide a circulation through the receptacle.

With the above and other objects in view, the invention further includes the following novel features and details of construction to be hereinafter more fully described, illustrated in the accompanying drawings and pointed out in the appended claims.

In the drawings:—

Figure 2 is a sectional view on the line 2—2 of Figure 1.

Figure 3 is an enlarged section on the line 3—3 of Figure 1.

Figure 4 is a top plan view of the outer panel of one of the top wall sections.

Figure 5 is a plan view of the inner panel of one of the top wall sections.

Figure 6 is a detail plan view showing a different form of liquid receptacle or coil.

Figure 7 is a side view of the coil shown in Figure 6.

Figure 1:
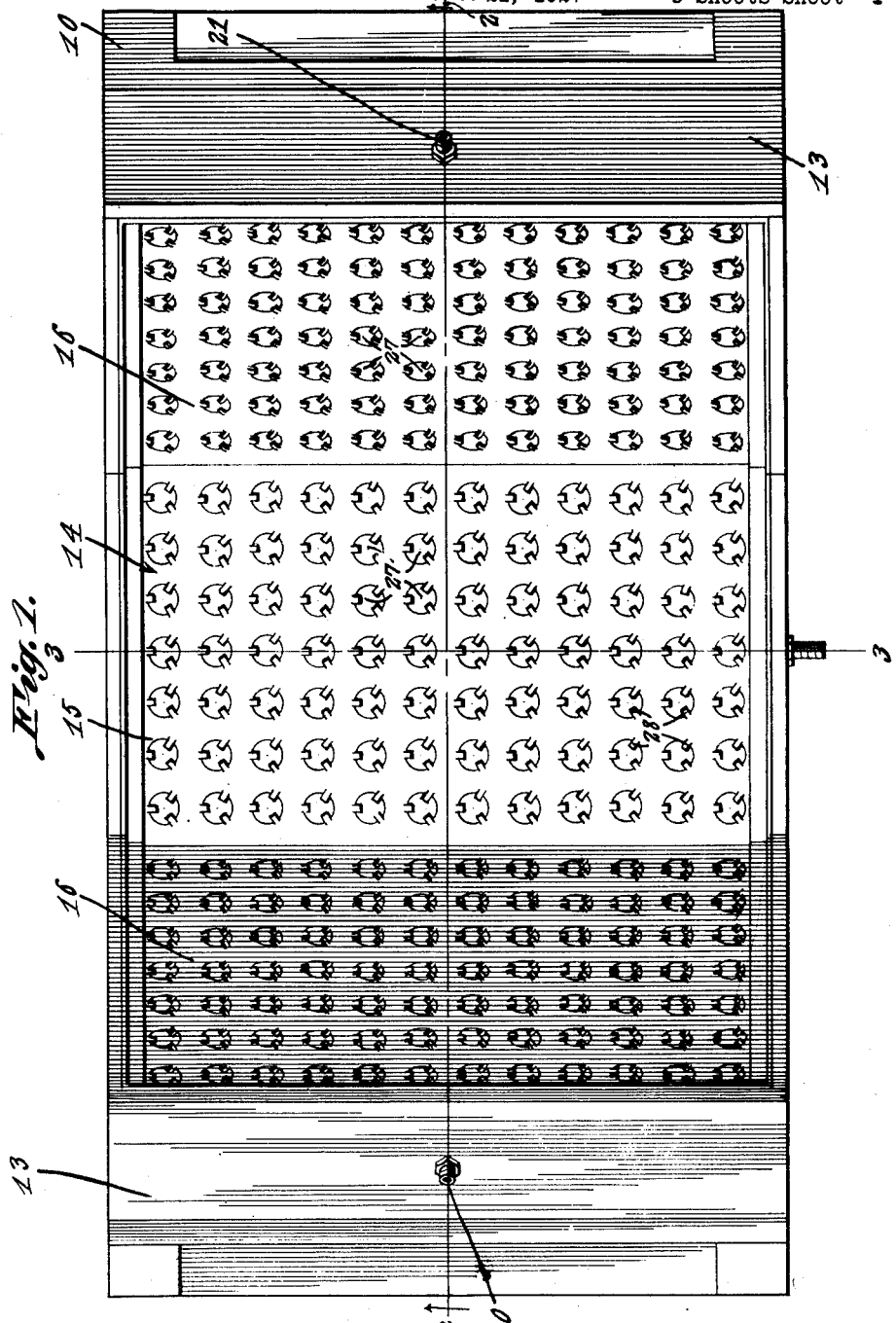
Figure 1 is a top plan view of a solar heater constructed in accordance with the present invention.

Referring to the drawings in detail wherein like characters of reference denote corresponding parts, the heater which may be placed in any advantageous position, is shown as supported upon the top of a building, a portion of which is indicated at B. The heater comprises a supporting frame 10 and a housing 11, the latter being of suitable configuration. This housing comprises a bottom wall 12 and side walls 13. The top wall of the housing is indicated at 14 and is shown as comprising a horizontal section 15 which has extending from its opposite edges, oppositely inclined sections 16. The sections 16 are arranged at a suitable angle, the purpose being to provide a maximum amount of surface for exposure to the sun's rays irrespective of the position of the sun, and within a relatively small area.

Located beneath and spaced from the top wall 14 is a receptacle 17. This receptacle is preferably of the same configuration as the top wall 14 and is adapted to contain water or other liquid 18. Located within the housing between the bottom of the wall of the receptacle 17 and the bottom wall 12 of the housing is a lining of heat insulating material 19. The receptacle is provided with an inlet 20 and outlets 21 and these inlets and outlets may be connected respectively with a suitable source of water supply and with receptacles or the like to which the heated water may be conducted.

The top wall 14 is of novel construction, each of the sections being formed of an inner panel 22 and an outer panel 23. These panels are provided with openings which are surrounded by flanges 24, the flanges 24 of one of the panels being telescopically received within the flanges 24 of the other panel. Passages 25 are thus provided through the top wall 14. Located at the outer ends of these passages are seats 26 which receive magnifying lenses 27, the latter being held in place by fingers 28 which extend from around the edges of the openings of the outer panels. The wall 14 is spaced from the top wall of the receptacle 17 and this space provides a heat chamber 29 with which the passages 25 communicate. An unobstructed passage for the sun's heat from the lenses 27 is thus provided for the upper wall of the receptacle 17, so that water within the said receptacle may be heated within a relatively short time. By reason of the relative angles of the sections of the top wall 14, a maximum amount of this wall will be presented to the rays of the sun as the latter moves over the horizon while heat within the chamber 29 may circulate through this chamber over the surface of the receptacle even though one of the end panels 16 is not exposed to the direct rays of the sun.

If desired, a coil such as is indicated at 30 in Figures 6 and 7 of the drawings may be substituted for the receptacle 17. This coil includes an inlet 31 and an outlet 32 for connection with sources of supply and distribution.

The invention is susceptible of various changes in its form, proportions and minor details of construction and the right is herein reserved to make such changes as properly fall within the scope of the appended claims.

Having described the invention what is claimed is:—

1. In a sun power water heater, a housing, a top wall for the housing, said wall including sections arranged at different angles, whereby one or more sections will be positioned transversely of the direct rays of the sun as the latter travels across the horizon, a receptacle located within the housing beneath the top wall, a heat insulating lining between the receptacle and bottom wall of the housing and lenses arranged within the section of the top wall of said housing.

2. In a sun power water heater, a housing, a top wall for the housing, said wall including sections arranged at different angles, whereby one or more sections will be positioned transversely of the direct rays of the sun as the latter travels across the horizon, a receptacle located within the housing beneath the top wall, a heat insulating lining between the receptacle and bottom wall of the housing, and lenses arranged within the section of the top wall of said housing, the inner faces of the lenses being opposed to the top of the receptacle to provide an unobstructed passage of heat through the lens to the receptacle.

3. In a sun power water heater, a housing, a top wall for the housing, said wall including sections arranged at different angles, whereby one or more of said sections will be positioned transversely of the direct rays of the sun, as the latter travels across the horizon, a receptacle located within the housing beneath the top wall and having the same configuration as said top wall, a heat insulating lining between the receptacle and bottom wall of the housing, and lenses arranged within the sections of the top wall of said housing.

4. In a sun power heater, a housing, a top wall for the housing, said wall including sections arranged at different angles, whereby one or more of said sections will be positioned transversely of the direct rays of the sun as the latter travels across the horizon, a receptacle located within the housing beneath the top wall and being spaced from said wall to provide a heat chamber, a heat insulating lining between the receptacle and bottom wall of the housing, and lenses arranged within the sections of the top wall of said housing.

5. In a sun power heater, a housing, a top wall for the housing, said wall comprising spaced inner and outer panels having openings therein, flanges surrounding the openings, with the flanges of one panel telescopically received within the flanges of the other panel and providing heat passages, seats at the outer end of the passages, lenses upon the seats, means engaging the lenses to hold the latter in position, a receptacle within the housing and an insulating lining between the bottom of the receptacle and the bottom of the housing.

6. In a sun power heater, a housing, a top wall for the housing, said wall comprising a horizontal section and oppositely inclined sections extending from the horizontal section, a receptacle located within the housing beneath the top wall, a heat insulating lining between the receptacle and bottom wall of the housing and lenses arranged within the sections of the top wall of said housing.

In testimony whereof I affix my signature.

WALTER CHRISTIANSEN.